(12) United States Patent
Pintore et al.

(10) Patent No.: US 11,834,811 B2
(45) Date of Patent: Dec. 5, 2023

(54) SYSTEM AND METHOD FOR CONTROLLING HYDRAULIC PUMP OPERATION WITHIN A WORK VEHICLE

(71) Applicant: CNH Industrial America LLC, New Holland, PA (US)

(72) Inventors: Francesco Pintore, Modena (IT); Stefano Fiorati, Ferrara (IT); Andrea Vacca, West Lafayette, IN (US); Xin Tian, Lafayette, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/509,426

(22) Filed: Oct. 25, 2021

(65) Prior Publication Data

US 2023/0128642 A1 Apr. 27, 2023

(51) Int. Cl.
*E02F 9/22* (2006.01)
*F15B 11/16* (2006.01)

(52) U.S. Cl.
CPC .......... *E02F 9/2228* (2013.01); *E02F 9/2285* (2013.01); *E02F 9/2296* (2013.01); *F15B 11/165* (2013.01)

(58) Field of Classification Search
CPC ............ F15B 11/165; F15B 2211/6054; F15B 2211/30535; F15B 2211/20553; E02F 9/2296
See application file for complete search history.

(56) References Cited

U.S. PATENT DOCUMENTS

| | | | | |
|---|---|---|---|---|
| 4,967,557 A | | 11/1990 | Izumi et al. | |
| 5,083,430 A | | 1/1992 | Hirata et al. | |
| 5,267,440 A | * | 12/1993 | Nakamura | E02F 9/2285 91/518 |
| 5,279,122 A | * | 1/1994 | Shirai | F15B 11/165 91/531 |
| 5,586,869 A | | 12/1996 | Benckert et al. | |
| 7,997,073 B2 | * | 8/2011 | Keuper | F15B 11/05 60/469 |
| 8,281,583 B2 | * | 10/2012 | Kauss | F15B 11/166 60/452 |
| 9,506,222 B2 | * | 11/2016 | Britten | F16H 61/421 |

(Continued)

FOREIGN PATENT DOCUMENTS

| | | |
|---|---|---|
| CN | 103807236 B | 9/2015 |
| EP | 294712 B1 | 4/1992 |
| EP | 3584450 A1 | 12/2019 |

*Primary Examiner* — Thomas E Lazo
(74) *Attorney, Agent, or Firm* — Rickard Demille; Rebecca Henkel

(57) ABSTRACT

A system for controlling pump operation within a work vehicle includes a pump configured to discharge hydraulic fluid into a fluid supply conduit for delivery to first and second hydraulic loads of an associated agricultural implement. Furthermore, the agricultural vehicle includes a pump compensator assembly configured to control the operation of the pump. The pump compensator assembly, in turn, includes a pump regulation actuator and a flow compensator valve. Moreover, the pump compensator assembly includes an electronically controlled pressure compensator valve configured to at least partially control the flow of the hydraulic fluid to the pump regulation actuator for use in controlling the operation of the pump.

17 Claims, 5 Drawing Sheets

(56) References Cited

U.S. PATENT DOCUMENTS

| | | | | |
|---|---|---|---|---|
| 9,759,212 | B2* | 9/2017 | Lingenfelter | F04B 1/324 |
| 11,143,212 | B2* | 10/2021 | Shirouzu | E02F 9/2246 |
| 2017/0254308 | A1* | 9/2017 | Mast | E02F 9/2217 |
| 2019/0345694 | A1* | 11/2019 | Schmuttermair | E02F 9/2025 |
| 2020/0056350 | A1* | 2/2020 | Shirouzu | F15B 11/165 |
| 2021/0180294 | A1* | 6/2021 | Shirouzu | E02F 9/2296 |

\* cited by examiner

SYSTEM AND METHOD FOR CONTROLLING HYDRAULIC PUMP OPERATION WITHIN A WORK VEHICLE

FIELD OF THE INVENTION

The present disclosure generally relates to work vehicles, such as an agricultural tractor or other agricultural vehicle. More specifically, the present disclosure is directed to systems and methods for controlling the operation of a pump within a work vehicle that is configured to supply hydraulic fluid to a plurality of hydraulic loads.

BACKGROUND OF THE INVENTION

A work vehicle, such as an agricultural tractor, typically includes a hydraulic system to actuate various components of the vehicle or an associated implement. For example, the hydraulic system may drive one or more fans (e.g., a bulk fill fan, a fertilizer fan, a vacuum fan, etc.), an alternator/generator, and/or other devices mounted on the implement. As such, the hydraulic system generally includes one or more hydraulic loads (e.g., hydraulic actuators, motors, and/or the like) and a pump configured to supply hydraulic fluid to the load(s).

Many hydraulic systems include redundant valve arrangements. For example, as indicated above, the hydraulic system of an agricultural tractor and an associated implement may include one or more hydraulic loads positioned on the implement. In this respect, the tractor typically includes one or more valves that control the flow of hydraulic fluid from its pump to the implement. Additionally, the implement includes one or more valves that control the flow of hydraulic fluid received from the tractor to the hydraulic load(s). During operation, the valve(s) on the tractor is typically fully opened, while the valve(s) on the implement is used to control the hydraulic fluid flow to hydraulic load(s). However, such a valve configuration generally results in the pump discharging hydraulic fluid at a pressure and/or flow rate that is much higher than is needed by the hydraulic load(s).

Accordingly, an improved system and method for controlling pump operation within a work vehicle, such as an agricultural vehicle, would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling pump operation within a work vehicle. The system includes a first hydraulic load, a second hydraulic load in parallel with the first hydraulic load, and a pump including a swash plate, with the pump configured to discharge hydraulic fluid into a fluid supply conduit for delivery to the first and second hydraulic loads. Additionally, the system includes first and second fluid conduits fluidly coupled between the fluid supply conduit and the first and second hydraulic loads, respectively. Moreover, the system includes a load sense conduit configured to receive a portion of the hydraulic fluid from the first or second fluid conduit in which the hydraulic fluid is at a greater pressure. In addition, the system includes a pump compensator assembly configured to control the operation of the pump. In this respect, the pump compensator assembly includes a pump regulation actuator configured to adjust a position of the swash plate based on a flow of the hydraulic fluid received from the load sense conduit or the fluid supply conduit. Furthermore, the pump compensator assembly includes a flow compensator valve fluidly coupled to the load sense conduit and the fluid supply conduit, with the flow compensator valve configured to at least partially control the flow of the hydraulic fluid to the pump regulation actuator. Additionally, the pump compensator assembly includes an electronically controlled pressure compensator valve fluidly coupled to the fluid supply conduit, with the pressure compensator valve configured to at least partially control the flow of the hydraulic fluid to the pump regulation actuator.

In another aspect, the present subject matter is directed to a method for controlling pump operation within a work vehicle. The work vehicle, in turn, includes a pump configured to discharge hydraulic fluid into a fluid supply conduit for delivery to first and second hydraulic loads, with the first hydraulic load being in parallel with the second hydraulic load. Moreover, the work vehicle includes a pump compensator assembly configured to control the operation of the pump. In this respect, the pump compensator assembly includes a pump regulation actuator configured to adjust a position of a swash plate of the pump based on a received flow of the hydraulic fluid, a flow compensator valve configured to at least partially control the flow of the hydraulic fluid to the pump regulation actuator, and a pressure compensator valve configured to at least partially control the flow of the hydraulic fluid to the pump regulation actuator. The method includes receiving, with a computing system, first pressure data indicative of a first fluid pressure associated with the first hydraulic load. In addition, the method includes determining, with the computing system, the first fluid pressure of the first hydraulic load based on the received first pressure data. Furthermore, the method includes receiving, with the computing system, second pressure data indicative of a second fluid pressure associated with the second hydraulic load. Additionally, the method includes determining, with the computing system, the second fluid pressure of the second hydraulic load based on the received second pressure data. Moreover, the method includes controlling, with the computing system, the operation of the pressure compensator valve based on the determined first or second pressure having a greater value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
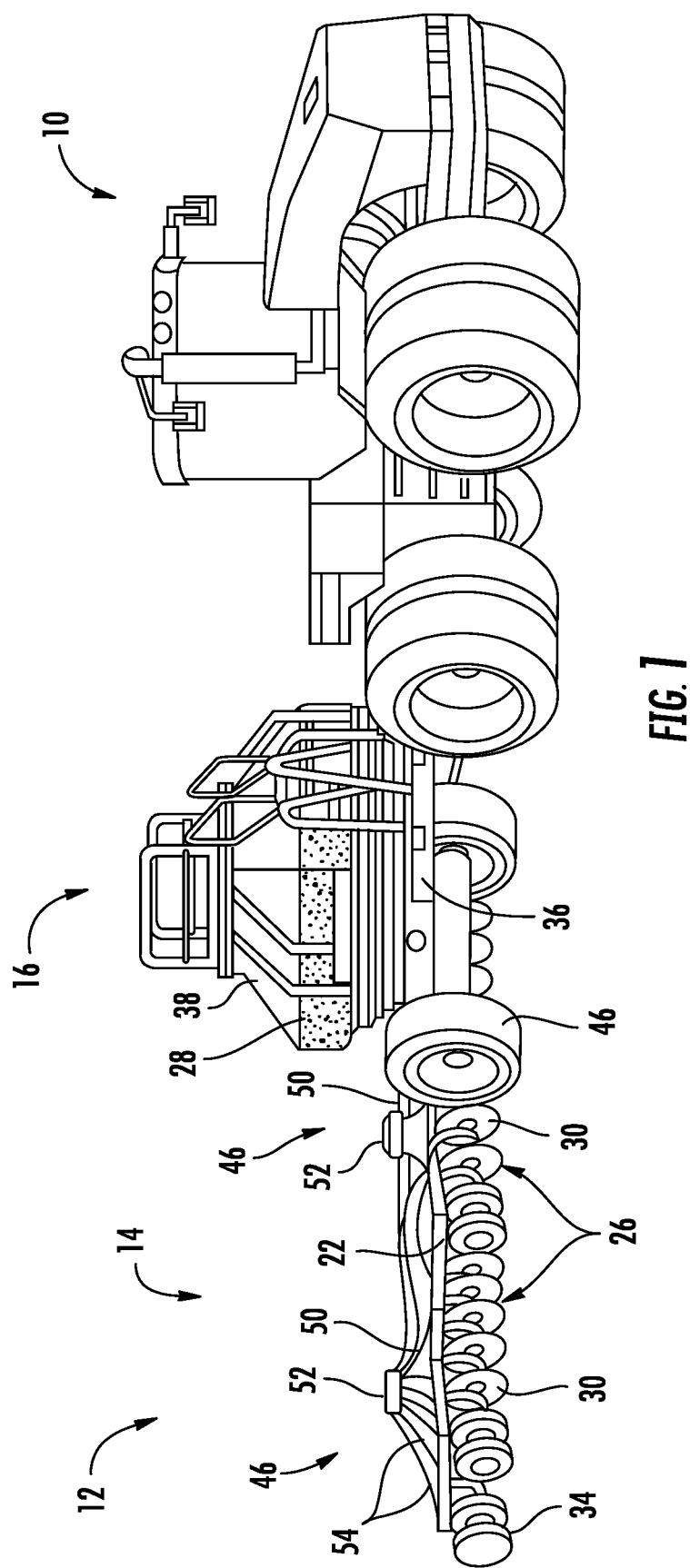
FIG. 1 illustrates a perspective view of one embodiment of a work vehicle and an associated implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling pump operation within a work vehicle, such as an agricultural vehicle. As will be described below, the vehicle includes a pump configured to discharge hydraulic fluid into a fluid supply conduit for delivery to first and second hydraulic loads (e.g., hydraulic actuators, pumps, etc.). The first hydraulic load is, in turn, in parallel with the second hydraulic load. Furthermore, the vehicle includes first and second fluid conduits fluidly coupled between the fluid supply conduit and the first and second hydraulic loads, respectively. Additionally, the vehicle includes a load sense conduit configured to receive a portion (e.g., a bleed flow) of the hydraulic fluid from the first or second fluid conduit in which the hydraulic fluid is at a greater pressure.

In several embodiments, the disclosed system includes a pump compensator assembly configured to control the operation of the pump. Specifically, the pump compensator includes a pump regulation actuator configured to adjust the position of a swash plate of the pump based on a flow of hydraulic fluid received from the load sense conduit or the fluid supply conduit. Controlling the position of the swash plate, in turn, controls the pressure and/or flow rate of the hydraulic fluid being discharged by the pump. Moreover, the pump compensator assembly includes a flow compensator valve fluidly coupled to the load sense conduit and the fluid supply conduit. In some embodiments, the flow compensator valve may be entirely fluidly controlled (e.g., based on pilot flows received from the load sense and fluid supply conduits). In addition, the pump compensator assembly includes an electronically controlled pressure compensator valve. In this respect, the pressure compensator valve may include an electric actuator controlled by a computing system of the vehicle configured to move the pressure compensator valve between first and second positions. For example, in some embodiments, the pressure compensator valve may be a pressure relief valve fluidly coupled to the load sense conduit. In other embodiments, the pressure compensator valve may be a to-way proportional valve fluidly coupled to the fluid supply conduit. As such, the flow and pressure compensator valves are configured to collectively control the flow of the hydraulic fluid from the fluid supply and load sense conduits to the pump regulation actuator, thereby controlling the pressure and/or flow rate of the hydraulic fluid being discharged by the pump.

The use of an electronically controlled pressure compensator valve in the pump compensator assembly improves the operation of the work vehicle. As mentioned above, the hydraulic system of many work vehicles includes redundant valves. For example, an agricultural vehicle (e.g., a tractor) may include a plurality of valves controlling the flow of hydraulic fluid from its pump to an associated implement. In addition, the implement may include a plurality of valves controlling the flow of hydraulic fluid received from the vehicle to the hydraulic loads thereon. During operation of the vehicle, the valves on the tractor are typically fully opened, while the valves on the implement are used to control the hydraulic fluid flow to hydraulic loads. The load sense conduit generally receives hydraulic fluid from the first or second fluid conduit having the higher pressure from a location between the redundant valves (e.g., the valves on the vehicle and the valves on the implement). In such instances, conventional systems control the operation of the pump based on the fully open positions of the upstream valves (e.g., the valves on the vehicle) and not the positions of the downstream valves being used to directly control the hydraulic fluid flow to the hydraulic loads (e.g., the valves on the implement). As such, in conventional systems, the pressure and/or flow rate of the hydraulic fluid discharged by the pump is typically much greater than is required by the hydraulic loads, thereby placing a higher than necessary load on the engine of the vehicle. However, by using an electronically controlled pressure compensator valve, the disclosed system and method allows for control of the pump based on the highest pressure of the hydraulic loads and not the positions of the fully opened upstream valves. Thus, the disclosed system and method reduce the load placed on the engine of the vehicle, thereby improving the fuel economy of the vehicle.

Figure 2:
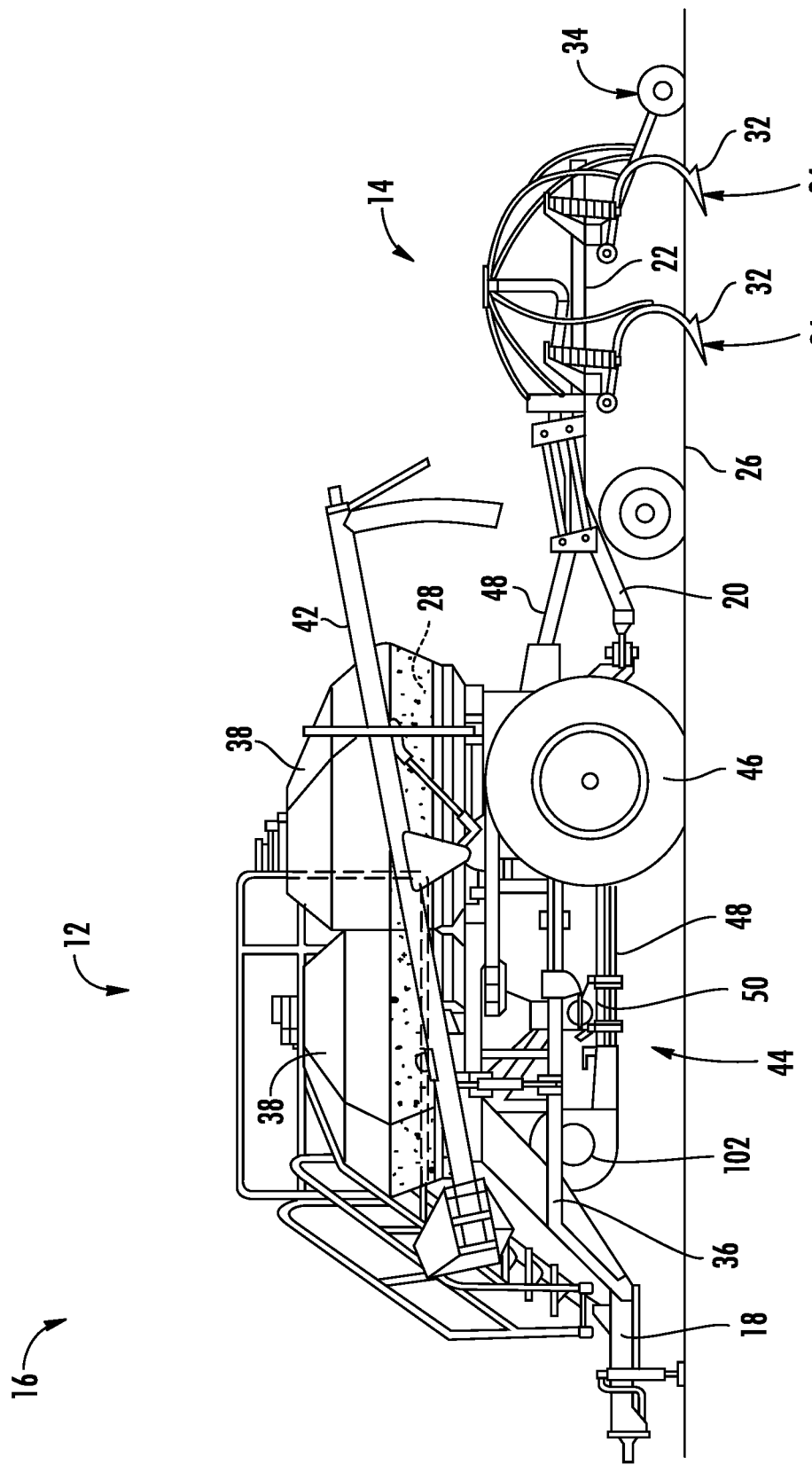
FIG. 2 illustrates a side view of the work vehicle shown in FIG. 1 and an alternative embodiment of the associated implement in accordance with aspects of the present subject matter.

Referring now to the drawings, FIGS. 1 and 2 illustrate differing side views of one embodiment of a work vehicle 10 and an associated implement 12. Specifically, FIG. 1 illustrates a side view of the work vehicle 10 and one embodiment of the associated implement 12. Additionally, FIG. 2 illustrates a side view of the work vehicle 10 and another embodiment of the associated implement 12. As shown, the implement 12 may be configured as a seed planting device 14 and an associated air cart 16 and the work vehicle 10 may be configured as an agricultural tractor. However, in other embodiments, the implement 12 may be configured as any other suitable type of implement, such as another seed dispensing implement, a tillage implement, and/or the like. Similarly, in alternative embodiments, the work vehicle 10 may be configured as any other suitable type of vehicle, such as another agricultural vehicle (e.g., an agricultural harvester, a self-propelled sprayer, etc.), a construction vehicle, and/or the like.

As shown, the air cart 16 may be configured to be towed directly behind the work vehicle 10, with the seed planting device 14 being towed behind the air cart 16. In this regard, a hitch assembly 18 (FIG. 2) may be configured to couple the air cart 16 to the work vehicle 10. Although the hitch assembly 18 is illustrated in FIG. 2 as corresponding to a hitch of the air cart 16, the hitch assembly 18 may also correspond to a hitch of the work vehicle 10. Furthermore, a hitch assembly 20 may be configured to couple the seed planting device 14 to the air cart 16. Although the hitch assembly 20 (FIG. 2) is illustrated as corresponding to a hitch of the seed planting device 14, the hitch assembly 20 may also correspond to a hitch of the air cart 16. Additionally, in alternative embodiments, the seed planting device 14 may be towed directly behind the work vehicle 10, with the air cart 16 being towed behind the seed planting device 14. For example, in such embodiments, the seed planting device 14 may be coupled to the work vehicle 10 via the hitch assembly 20 and the air cart 16 may be coupled to the seed planting device 14 via the hitch assembly 18.

In several embodiments, the seed planting device 14 may include a frame 22 configured to support or couple to various components of the seed planting device 14, such as one or more ground-engaging tools 24. In general, the ground-engaging tool(s) 24 may be configured to excavate a furrow or trench in soil 26 to facilitate deposition of a flowable granular or particulate-type agricultural product 28, such as seeds, fertilizer, and/or the like. For example, in the embodiment illustrated in FIG. 1, each ground-engaging tool 24 may be configured as an opener disc 30. Alternatively, in the embodiment shown in FIG. 2, each ground-engaging tool 24 may be configured as a hoe or shank 32. Furthermore, the seed planting device 14 may generally include any number of ground-engaging tools 24 to facilitate delivery of the agricultural product 28 across a given swath of the soil 26. Additionally, the seed planting device 14 may also include one or more closing wheels or discs 34 configured to close the furrow after the agricultural product 28 has been deposited into the furrow.

Moreover, the air cart 16 may be configured to store the agricultural product 28 to be deposited within the soil 26. Specifically, in several embodiments, the air cart 16 may include a frame 36 configured to support or couple to various components of the air cart 16. For example, as shown, the frame 36 may be configured to support a hopper or storage tank 38 configured for storing the agricultural product 28 to be deposited within the furrow. The frame 36 may also be configured to support a vacuum fan or pressurized air source 102 (FIG. 2) and a tank filling mechanism 42 (FIG. 2), such as an auger, conveyor, and/or the like. Moreover, a metering system 44 (FIG. 2) may be supported on the frame 36. Additionally, in one embodiment, a plurality of wheels 46 may be coupled to the frame 36 to permit the air cart 16 to be towed across a field by the work vehicle 10.

Furthermore, a plurality of delivery conduits 48 of the implement 12 may be configured to convey the agricultural product 28 from the air cart 16 to the seed planting device 14 for deposition into the furrow. Specifically, in several embodiments, the agricultural product 28 contained within the hopper 38 may be gravity fed into the metering system 44. As such, the metering system 44 may be configured to distribute a desired quantity of the agricultural product 28 to the delivery conduits 48. For example, in one embodiment, a primary header 50 (FIG. 2) coupled between the metering system 44 and the delivery conduits 48 may direct the agricultural product 28 into each of the delivery conduits 48. Pressurized air provided by the fan 102 to the delivery conduits 48 may then carry the agricultural product 28 through the delivery conduits 48 to the seed planting device 14.

It should be appreciated that the configuration of the work vehicle 10 and the implement 12 described above and shown in FIGS. 1 and 2 is provided only to place the present subject matter in an exemplary field of use. Thus, it should be appreciated that the present subject matter may be readily adaptable to any manner of work vehicle and/or implement configuration.

Figure 3:
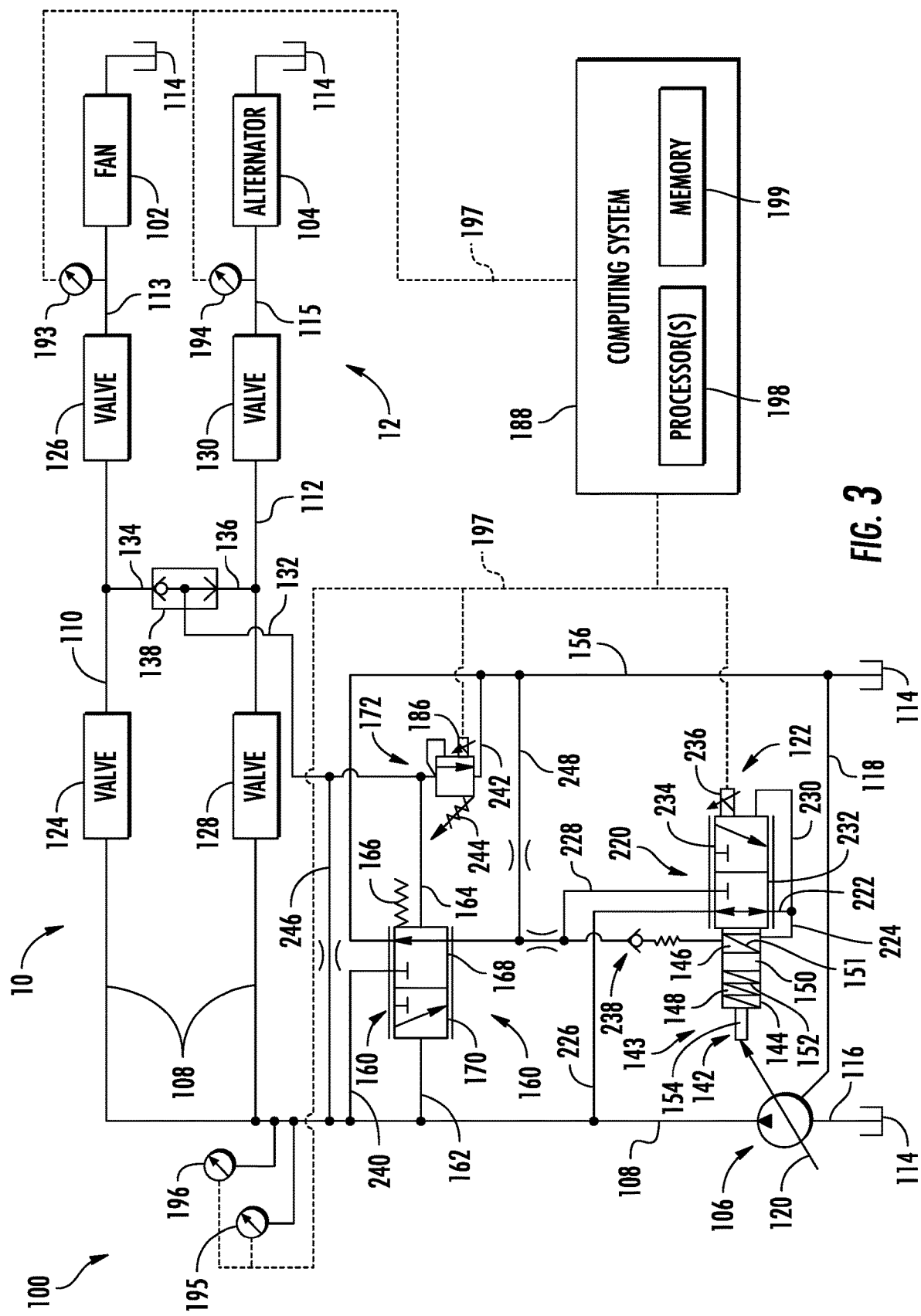
FIG. 3 illustrates a schematic view of one embodiment of a system for controlling pump operation within a work vehicle in accordance with aspects of the present subject matter.

Referring now to FIG. 3, a schematic view of one embodiment of a system 100 for controlling pump operation within a work vehicle is illustrated in accordance with aspects of the present subject matter. In general, the system 100 will be described herein with reference to the work vehicle 10 and the implement 12 described above with reference to FIGS. 1 and 2. However, it should be appreciated by those of ordinary skill in the art that the disclosed system 100 may generally be utilized with work vehicle having any other suitable vehicle configuration and/or any implement having any suitable implement configuration. Additionally, in some embodiments, the system 100 may only include the work vehicle 10 and not the implement 12. For purposes of illustration, hydraulic connections between components of the system 100 are shown in solid lines while electrical connection between components of the system 100 are shown in dashed lines.

In several embodiments, the system 100 may include one or more hydraulic loads of the work vehicle 10 and/or the associated implement 12. In this respect, as will be described below, the system 100 may be configured to regulate or otherwise control the hydraulic fluid flow within the work vehicle 10 such that the hydraulic fluid is supplied to the load(s) of the vehicle 10 and/or implement 12 in a manner that reduces the energy consumption of the vehicle 10. For example, in the illustrated embodiment, the system 100 includes the fan 102 and an alternator 104 of the implement 12. As shown, the fan 102 and an alternator 104 are in parallel with each other. However, the hydraulic load(s) may correspond to any suitable fluid-powered devices on the vehicle 10 or an associated implement, such as hydraulic cylinder(s), motor(s), and/or the like. Moreover, the system 100 may include any other suitable number of hydraulic load(s).

Furthermore, the system 100 may include a pump 106 configured to supply hydraulic fluid to the hydraulic loads) of the vehicle 10 and/or implement 12 via a fluid supply conduit 108. In addition, the system 100 includes first, second, third, and fourth fluid conduits 110, 112, 113, 115 fluidly coupled between the fluid supply conduit 108 and the hydraulic load(s). Specifically, in several embodiments, the pump 106 may be configured to supply hydraulic fluid to the fan 102 of the implement 12 via the fluid supply conduit 108 and the first and third fluid conduits 110, 113. Moreover, in several embodiments, the pump 106 may be configured to supply hydraulic fluid to the alternator 104 of the implement 12 via the fluid supply conduit 108 and the second and fourth fluid conduits 112, 115. However, in alternative embodiments, the pump 106 may be configured to supply hydraulic fluid to any other suitable hydraulic loads of the vehicle 10 and/or the implement 12. Additionally, the pump 106 may be in fluid communication with a fluid tank or reservoir 114 via conduits 116, 118 to allow hydraulic fluid stored within the reservoir 114 to be pressurized and supplied to the fan 102 and the alternator 104.

In several embodiments, the pump 106 may be a variable displacement pump configured to discharge hydraulic fluid across a given pressure range. Specifically, the pump 106 may supply pressurized hydraulic fluid within a range bounded by a minimum pressure and a maximum pressure capability of the variable displacement pump. In this respect, the pump 106 may include a swash plate 120 that is controlled mechanically via a pump compensator assembly 122 to adjust the position of the swash plate 120 of the pump 106, as necessary, based on the load applied to the hydraulic system of the vehicle 10.

Furthermore, the system 100 may include a plurality of flow control valves. In general, the flow control valves may be fluidly coupled to the first and second fluid conduits 110, 112 upstream of the corresponding hydraulic loads such that the flow control valves are configured to control the flow rate and/or pressure of the hydraulic fluid being supplied to the load(s). Specifically, in several embodiments, the system 100 may include first and second flow control valves 124, 126 fluidly coupled to the first and third fluid conduits 110, 113 upstream of the fan 102. For example, the first flow control valve 124 is fluidly coupled to the downstream end of one branch of the fluid supply conduit 108 and the upstream end of the first fluid conduit 110. The second flow control valve 126 is fluidly coupled to the downstream end of the first fluid conduit 110 and the upstream end of the third fluid conduit 113. Thus, the first and second flow control valves 124, 126 are configured to control the flow rate and/or pressure of the hydraulic fluid being supplied to the fan 102. Moreover, in such embodiments, the system 100 may include third and fourth flow control valves 128, 130 fluidly coupled to the second and fourth fluid conduits 112, 115 upstream of the alternator 104. For example, the third flow control valve 128 is fluidly coupled to the downstream end of another branch of the fluid supply conduit 108 and the upstream end of the second fluid conduit 112. The fourth flow control valve 130 is fluidly coupled to the downstream end of the second fluid conduit 110 and the upstream end of the fourth fluid conduit 115. Thus, the third and fourth flow control valves 128, 130 are configured to control the flow rate and/or pressure of the hydraulic fluid being supplied to the alternator 104. As shown, the first and third control valves 124, 128 are further positioned upstream from the second and fourth control valves 126, 130, respectively. For example, in some embodiments, the first and third control valves 124, 128 may be positioned on the vehicle 10 and the second and fourth control valves 126, 130 may be positioned on the implement 12.

The flow control valves 124, 126, 128, 130 may be configured as any suitable valves configured to control the flow rate and/or pressure of the hydraulic fluid flowing through the first and second fluid conduits 110, 112. For example, in one embodiment, flow control valves 124, 126 128, 130 may be proportional directional valves.

Additionally, the system 100 may include a load sense conduit 132. In general, the load sense conduit 132 may receive hydraulic fluid bled from the first or second fluid conduit 110, 112 having the greater pressure therein. More specifically, the system 100 may include a first bleed conduit 134 fluidly coupled to the first fluid conduit 110 downstream of the first flow control valve 124 and upstream of the second flow control valve 126. Furthermore, the system 100 may include a second bleed conduit 136 fluidly coupled to the second fluid conduit 112 downstream the third flow control valve 128 and upstream of the fourth flow control valve 130. Thus, the first bleed conduit 134 may receive hydraulic fluid bled from the first fluid conduit 110 and the second bleed conduit 136 may receive hydraulic fluid bled from the second fluid conduit 112. Additionally, the system 100 may include a shuttle valve 138 fluidly coupled to the first and second bleed conduits 134, 136 and the load sense conduit 132. The shuttle valve 138 may, in turn, be configured to supply hydraulic fluid from the first or second bleed conduit 134, 136 having the greater pressure therein to the load sense conduit 132. In this respect, the hydraulic fluid supplied to the load sense conduit 132 may have the same pressure as the fluid conduit 110, 112 having the greater pressure therein.

Moreover, the system 100 includes the pump compensator assembly 122, configured to control the operation of the pump 106. Specifically, as shown, the pump compensator assembly 122 is fluidly coupled to the fluid supply conduit 108. Additionally, the pump compensator assembly 122 is fluidly coupled to load sense conduit 132. As will be described below, the pump compensator assembly 122 includes various components configured to use the received hydraulic fluid from the fluid supply conduit 108 and the load sense conduit 132 to adjust the position of the swash plate 120 of the pump 106, as necessary, based on the load on the hydraulic system of vehicle/implement 10/12.

As shown, the pump compensator assembly 122 includes a pump regulation actuator 142. In general, the pump regulation actuator 142 is configured to adjust the position of the swash plate 120 of the pump 106 based on a received flow of hydraulic fluid. As will be described below, other components of the pump compensator assembly 122 determine whether the pump regulation actuator 142 receives a flow of the hydraulic fluid from the load sense conduit 132 (i.e., fluid having the same pressure as the greater of the pressures in the first and second fluid conduits 110, 112), a flow of fluid from the fluid supply conduit 108, or no flow at all. Based on the pressure of the received hydraulic fluid, the pump regulator actuator 142 adjusts the position of the swash plate 120.

In the illustrated embodiment, the pump regulator actuator 142 includes a hydraulic cylinder 143. More specifically, as shown, the hydraulic cylinder 143 includes a housing 144 defining first and second fluid chambers 146, 148 separated by a movable piston 150. A biasing element 151 (e.g., a spring) is positioned within the first chamber 146, and a biasing element 152 (e.g., a spring) is positioned within the second chamber 148. Furthermore, as will be described below, the first chamber 146 is configured to receive hydraulic fluid from either the load sense conduit 132 or the fluid supply conduit 108. In this respect, the piston 150 moves within the housing 144 based on the difference in the force exerted on one side of the piston 150 by the first biasing element 151 and the hydraulic fluid in the first chamber 146 and the force exerted the other side of the piston 150 by the biasing element 152. For example, when the force exerted by the first biasing element 151 and the hydraulic fluid within the first chamber 146 exceeds the force exerted by the biasing element 152, the first chamber 146 expands and the second chamber 148 contracts. Such movement of the piston 150 causes a rod 154 coupled to the piston 150 to extend from the housing 144, thereby moving the swash plate 120 in a manner that increases the pressure and/or flow rate of the hydraulic fluid being discharged by the pump 106. Conversely, when the force exerted by the first biasing element 151 and the hydraulic fluid within the first chamber 146 falls below the force exerted by the biasing element 152, the first chamber 146 contracts and the second chamber 148 expands. Such movement of the piston 150 causes the rod 154 to retract into the housing 144, thereby moving the swash plate 120 in a manner that decreases the pressure and/or flow rate of the hydraulic fluid being discharged by the pump 106. However, in alternative embodiments, the pump regulator actuator 142 may include any other type of actuator or mechanism configured to adjust the position of the swash plate 120 based on a received flow of hydraulic fluid.

Moreover, in the illustrated embodiment, the pump regulator actuator 142 includes a pump regulator valve 220. In general, the pump regulator valve 220 is configured to control the flow of hydraulic fluid to the first chamber 146 of the hydraulic actuator 143. Specifically, in several embodiments, the pump regulator valve 220 is fluidly coupled to the first chamber 146 via conduits 222, 224. The pump regulator valve 220 may also be fluidly coupled to the fluid supply conduit 108 via a conduit 226. In addition, the pump regulator valve 220 may also fluidly coupled to a conduit 228, which receives hydraulic fluid from either the fluid supply conduit 108 or the load sense conduit 132 depending on the operation of one or more upstream valves within the pump compensator 122. In addition, the pump regulator valve 220 may include a pilot conduit 230 that supplies a pilot flow of hydraulic fluid from the conduit 222 to the pump regulator valve 220.

Additionally, in several embodiments, the pump regulator valve 220 may include an electric actuator 236 configured to move the valve 220 between a first position 232 and a second position 234. More specifically, the pilot flow of hydraulic fluid supplied by the pilot conduit 230 may exert a biasing force on the pump regulator valve 220 such that the valve 220 is normally at the first position 232. When at the first position 232, the pump regulator valve 220 supplies hydraulic fluid from the fluid supply conduit 108 (e.g., via the conduit 226) to the first chamber 146 of the hydraulic cylinder 143. However, the electric actuator 236 may, upon instructions from a computing system 188, move the pump regulator valve 220 to the second position 234. When at the second position 234, the pump regulator valve 220 supplies hydraulic fluid from the conduit 228 to the first chamber 146.

Moreover, the pump compensator assembly 122 may include a compensator conduit 156. As shown, the compensator conduit 156 is fluidly coupled between the pump regulator actuator 142 (e.g., its first chamber 146) and the reservoir 114. As will be described below, the compensator conduit 156 may be fluidly coupled to valves within the pressure compensator assembly 122. Such valves and the pump regulator valve 220, in turn, control whether hydraulic fluid from the fluid supply conduit 108 or hydraulic fluid from the load sense conduit 132 is supplied to the pump regulator actuator 142. Additionally, a check valve 238 may be configured to prevent hydraulic fluid from the first chamber of the hydraulic cylinder 143 from flowing toward the reservoir 114.

Furthermore, the pump compensator assembly 122 includes a flow compensator valve 160. In general, the flow compensator valve 160 is fluidly coupled to the fluid supply conduit 108 via a conduit 240. In addition, the flow compensator valve 160 is fluidly coupled to the compensator conduit 156. As will be described below, the compensator conduit 156 may, in certain instances, be fluidly coupled to the load sense conduit 132. In this respect, the flow compensator valve 160 is configured to at least partially control the flow of hydraulic fluid to the pump regulation actuator 142.

In several embodiments, the flow compensator valve 160 may be entirely fluidly controlled. For example, the flow compensator valve 160 may be a pilot-operated valve. More specifically, in such embodiments, a pilot conduit 162 may be fluidly coupled to the flow compensator valve 160 and the fluid supply conduit 108 140. As such, the pilot conduit 162 may provide a pilot flow of hydraulic fluid from the fluid supply conduit 108 to the flow compensator valve 160. Furthermore, a pilot conduit 164 may be fluidly coupled to the flow compensator valve 160 and the load sense conduit 132. In this respect, the pilot conduit 164 may provide a pilot flow of hydraulic fluid from the load sense conduit 132 to the flow compensator valve 160. Additionally, the flow compensator valve 160 may have a biasing element 166, such as a spring, that sets a valve margin.

Additionally, in several embodiments, the flow compensator valve 160 may movable between a first position 168 and a second position 170. More specifically, the biasing element 166 may exert a biasing force on the flow compensator valve 160 such that the valve 160 is normally at the first position 168. Thus, when the pressure of the hydraulic fluid in the pilot conduit 162 falls below the sum of the pressure in the hydraulic fluid in the pilot conduit 164 and the pressure exerted by the biasing element 166, the flow compensator valve 160 is at the first position 168. When at the first position 168, the flow compensator valve 160 allows the fluid within the compensator conduit 156 to flow through the valve 160 toward the reservoir 114. However, when the pressure of the hydraulic fluid in the pilot conduit 162 exceeds the sum of the pressure in the hydraulic fluid in the pilot conduit 164 and the pressure exerted by the biasing element 166, the flow compensator valve 160 moves to the second position 170. When at the second position 170, the flow compensator valve 160 supplies hydraulic fluid from the fluid supply conduit 108 and the conduit 240 to the compensator conduit 156.

Furthermore, the system 100 includes the electronically controlled pressure compensator valve 172. In general, the pressure compensator valve 172 is fluidly coupled to the load sense conduit 132 and a conduit 242, with the conduit 242. being fluidly coupled to the compensator conduit 156. In the illustrated embodiment, the pressure compensator valve 172 is configured as a pressure relief valve. Thus, when the pressure within the load sense conduit 132 exceeds a predetermined pressure, the pressure compensator valve 172 is configured to selectively allow fluid from the load sense conduit 132 to flow to the compensator conduit 156. More specifically, in such an embodiment, the pressure compensator valve 172 may be biased via a biasing element 244 (e.g., a spring) to a first or closed position. When at the closed position, the pressure compensator valve 172 occludes or otherwise prevents the flow of the hydraulic fluid from the load sense conduit 132 to the conduit 242 and the compensator conduit 156. However, when the pressure of the hydraulic fluid within the load sense conduit 132 exceeds the biasing force exerted by the biasing element 244, the pressure compensator valve 172 moves to a second or opened position. When at the opened position, the pressure compensator valve 172 permits the flow of the hydraulic fluid from the load sense conduit 132 to the conduit 242 and the compensator conduit 156. In this respect, the pressure compensator valve 172 is configured to at least partially control the flow of hydraulic fluid to the pump regulation actuator 142.

Furthermore, in several embodiments, the pressure compensator valve 172 includes an electric actuator 186. In general, the electric actuator 186 is configured to move the pressure compensator valve 172 between the first/closed and second/opened positions. As such, the electric actuator 186 can override the operation of the pressure compensator valve 172 based on the pressure of the hydraulic fluid within the load sense conduit 132. As will be described below, the electric actuator 186 may be controlled by a computing system 188 based on the maximum fluid pressure needed by the hydraulic loads, thereby reducing the energy consumption of the vehicle 10. For example, when the pressure within the load sense conduit 132 is such that the pressure compensator valve 172 is at the closed position, the electric actuator 186 may, upon instructions from the computing system 188, move the pressure compensator valve 172 to the opened position. Similarly, when the pressure within the load sense conduit 132 is such that the pressure compensator valve 172 is at the opened position, the electric actuator 186 may, upon instructions from the computing system 188, move the pressure compensator valve 172 to the closed position. The electric actuator 186 may correspond to any suitable electric actuator that can be controlled by the computing system 188, such as a solenoid, an electric linear actuator, a stepper motor, and/or the like.

As mentioned above, the pump regulator valve 220, the flow compensator valve 160, and the pressure compensator valve 172 control the flow of hydraulic fluid from the fluid supply conduit 108 and the load sense conduit 132 to the hydraulic cylinder 143 of the pump regulation actuator 142. This flow of hydraulic fluid, in turn, controls the operation of the pump regulation actuator 142 and, thus, the pump 106. More specifically, when the pump regulator valve 220 is at the first position 232 (and regardless of the positions of the flow and pressure compensator valves 160, 172), hydraulic fluid from the fluid supply conduit 108 is supplied to the first chamber 146 of the hydraulic actuator 143 via the compensator conduit 156. Conversely, when the pump regulator valve 220 is at the second position 234, the flow compensator valve 160 is at the first position 168, and the pressure compensator valve 172 is at the closed position, no hydraulic fluid is supplied to the first chamber 146 of the hydraulic actuator 143. Additionally, when the pump regulator valve 220 is at the second position 234, the flow compensator valve 160 is at the first position 168, and the pressure compensator valve 172 is at the opened position, hydraulic fluid from the load sense conduit 132 is supplied to the first chamber 146 of the hydraulic actuator 143 via the conduit 242 and the compensator conduit 156. Moreover, when the pump regulator valve 220 is at the second position 234 and the flow compensator valve 160 is at the second position 170 (and regardless of the position of the pressure compensator valve 172), hydraulic fluid from the fluid supply conduit 108 is supplied to the first chamber 146 of the hydraulic actuator 143 via the conduit 240 and the compensator conduit 156.

In addition, the pump compensator assembly 122 may include any other suitable fluid conduits and or flow control devices (e.g., valves, orifices, etc.). For example, in the illustrated embodiment, the pump compensator assembly 122 include a conduit 246 fluidly coupled between the fluid supply conduit 108 and the load sense conduit 132. Furthermore, the pump compensator assembly 122 include a conduit 248 fluidly coupled between a location on the compensator conduit 156 between the check valve 238 and the flow compensator valve 160 and another location on the compensator conduit 156 between the flow compensator conduit valve 160 and the reservoir 114.

In several embodiments, the system 100 may include one or more pressure sensors. In generally, the pressure sensor(s) may be configured to capture data indicative of the pressure of the hydraulic fluid at differing locations within the hydraulic system of the vehicle 10. Specifically, in one embodiment, a first pressure sensor 193 may be fluidly coupled to the third fluid conduit 113 between the second valve 126 and the corresponding hydraulic load (e.g., the fan 102). As such, the first pressure sensor 193 may be configured to capture data indicative of the pressure of the hydraulic fluid at such location within the third fluid conduit 113. Furthermore, a second pressure sensor 194 may be fluidly coupled to the fourth fluid conduit 115 between the fourth valve 130 and the corresponding hydraulic load (e.g., the alternator 104). As such, the second pressure sensor 194 may be configured to capture data indicative of the pressure of the hydraulic fluid at such location within the fourth fluid conduit 115. Additionally, a third pressure sensor 195 may be fluidly coupled to the fluid supply conduit 108 adjacent to the pump 106. As such, the third pressure sensor 195 may be configured to capture data indicative of the pressure of the hydraulic fluid being discharged by the pump 106. The pressure sensors 193, 194, 195 may correspond to any suitable pressure sensors or pressure sensing devices, such as diaphragm pressure sensors, piston pressure sensors, strain gauge-based pressure sensors, electromagnetic pressure sensors, and/or the like.

Moreover, in several embodiments, the system 100 may include one or more flow sensors. In generally, the flow sensor(s) may be configured to capture data indicative of the flow rate of the hydraulic fluid at differing locations within the hydraulic system of the vehicle 10. For example, in one embodiment, a flow sensor 196 may be configured to capture data indicative of the flow rate of the hydraulic fluid being discharged by the pump 106. The flow sensor 196 may, in turn, correspond to any suitable flow sensor or flow sensing devices. For example, in some, the flow sensor 196 may correspond to a gear flow meter, a piston flow meter, a venturi flow meter, or the like fluidly coupled to the fluid supply conduit 108 adjacent to the pump 106. Alternatively, in another embodiment, the flow sensor 196 may be a Hall Effect sensor configured to detect the rotational speed of an impeller (not shown) of the pump 106. Such rotational speed data may be used with pressure data from the third pressure sensor 195 to determine the flow rate of the hydraulic fluid being discharged by the pump 106. In a further embodiment, the flow sensor 196 may be a potentiometer configured to detect the position of the swash plate 120. Such position data may be used with pressure data from the third pressure sensor 195 to determine the flow rate of the hydraulic fluid being discharged by the pump 106.

Additionally, the system 100 may include a computing system 188 communicatively coupled to one or more components of the work vehicle 10, the implement 12, and/or the system 100 to allow the operation of such components to be electronically or automatically controlled by the computing system 188. For instance, the computing system 188 may be communicatively coupled to the electric actuator 186 via a communicative link 197. As such, the computing system 188 may be configured to control the operation of the electric actuators 186, 236 to control the flow of hydraulic fluid through the pump compensator assembly 122 such that the energy consumption of the vehicle 10 is reduced. Moreover, the computing system 188 may be communicatively coupled to the pressure sensors 193, 194, 195 and the flow sensor 196 via the communicative link 197. Thus, the computing system 188 may be configured to receive data from these sensors 193, 194, 195, 196 that is indicative of the pressures and flows rates of the hydraulic fluid at the corresponding locations within the system 100.

In general, the computing system 188 may comprise one or more processor-based devices, such as a given controller or computing device or any suitable combination of controllers or computing devices. Thus, in several embodiments, the computing system 188 may include one or more processor(s) 198 and associated memory device(s) 199 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 199 of the computing system 188 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 199 may generally be configured to store suitable computer-readable instructions that, when implemented by the processor(s) 198, configure the computing system 188 to perform various computer-implemented functions, such as one or more aspects of the methods and algorithms that will be described herein. In addition, the computing system 188 may also include various other suitable components, such as a communications circuit or module, one or more input/output channels, a data/control bus and/or the like.

The various functions of the computing system 188 may be performed by a single processor-based device or may be distributed across any number of processor-based devices, in which instance such devices may be considered to form part of the computing system 188. For instance, the functions of the computing system 188 may be distributed across multiple application-specific controllers or computing devices, such as an implement controller, a navigation controller, an engine controller, and/or the like.

In several embodiments, the computing system 188 may be configured to receive pressure data indicative of the pressure of the hydraulic fluid at one or more locations within the system 100. Specifically, in several embodiments, the computing system 188 is communicatively coupled to the first, second, and/or third pressure sensors 193, 194, 195 via the communicative link 197. In this respect, during operation of the work vehicle 10, the computing system 188 may receive first, second, and/or third pressure data from the first, second, and/or third pressure sensors 193, 194, 105 that is indicative of the first, second, and/or third pressures of the hydraulic fluid, respectively.

Furthermore, the computing system 188 may be configured to determine one or more pressures of the hydraulic fluid within the system 100. Specifically, in several embodiments, the computing system 188 may be configured to determine the first, second, and/or third hydraulic pressures based on the received first, second, and/or third pressure data, respectively. The determined first pressure corresponds to the pressure of the hydraulic fluid being supplied to the first hydraulic load (e.g., the fan 102). Moreover, the determined second pressure corresponds to the pressure of the hydraulic fluid being supplied to the second hydraulic load (e.g., the alternator 104). In addition, the determined third pressure corresponds to the pressure of the hydraulic fluid being discharged by the pump 106.

Additionally, in some embodiments, the computing system 188 may be configured to receive flow data indicative of the flow rate of the hydraulic fluid at one or more locations within the system 100. Specifically, in one embodiment, the computing system 188 is communicatively coupled to the flow sensor 196 via the communicative link 197. In this respect, during operation of the work vehicle 10, the computing system 188 may receive data indicative of the flow sensor 196 that is indicative of the flow rate of the hydraulic fluid being discharged by the pump 106.

Moreover, in one embodiment, the computing system 188 may be configured to determine one or more flow rates of the hydraulic fluid within the system 100. Specifically, in one embodiment, the computing system 188 may be configured to determine the flow rate of the hydraulic fluid being discharged from the pump 106 based on the received flow data.

In addition, the computing system 188 may be configured to control the operation of the pressure compensator valve 172 and/or the pump regulator valve 220 of the pump compensator assembly 122 based on the determined pressures and/or flow rates. More specifically, the computing system 188 may be configured to control the operation of the electric actuators 186, 236 of the pressure compensator valve 172 based on the determined first pressure, second pressure, third pressure, and/or flow rate. For example, the computing system 188 may control the operation of the electric actuators 186, 236 based on the greater of the determined first and second pressures as well as the determined third pressure and the determined flow rate. As such, the computing system 188 may transmit control signals to the electric actuator 186 via the communicative link 197. The control signals, in turn, instruct the electric actuator 186 to move the pressure compensator valve 172 to either its closed/first position or its opened/second position in a manner that reduces the energy consumption of the vehicle 10. Furthermore, the computing system 188 may transmit control signals to the electric actuator 236 via the communicative link 197. The control signals, in turn, instruct the electric actuator 236 to move the pump regulator valve 220 to either its first position 232 or its second position 234 in a manner that reduces the energy consumption of the vehicle 10.

Controlling the operation of the pressure compensator valve 172 based on the determined first and second pressures improves the operation of the vehicle 10. More specifically, during operation of the vehicle/implement 10/12, the operator may open the first and third valves 126, 130 fully, while using the second and fourth valves 128, 130 to control the pressure and/or flow rate of the hydraulic fluid provided to the fan 102 and the alternator 104. As such, in many instances, there may be a large pressure drop across the second and fourth valves 126, 130. Moreover, as described above, the load sense conduit 132 is fluidly coupled to the first and second fluid conduits 110, 112 upstream of the second and fourth valves 126, 130. Thus, the pressure of the hydraulic fluid within the load sense conduit 132 may be much greater than the pressures of the hydraulic fluid received by the fan 102 and the alternator 104. In this respect, controlling the operation of the pressure compensator valve 172 based entirely on the pilot flows in the pilot conduits 176, 178 may generally result in the pump 106 discharging hydraulic fluid at a greater than necessary pressure. However, with the disclosed system 100, the electric actuator 186 of the pressure compensator valve 172 may override the control of the valve 172 based on the pilot flows and, instead, control the valve 172 based on the determined first and second pressures, which are indicative of the pressures of the hydraulic fluid received by the fan 102 and the alternator 104. Since these pressures are generally lower than the pressure in the load sense conduit 132, the pump 106 discharges fluid at a lower pressure than it would using pilot flow-based control of the pressure compensator valve 172, while still meeting the minimum pressures and flow rates required by the fan 102 and the alternator 104. As such, the disclosed system 100 reduces the load on the engine of the vehicle 10, thereby improving its efficiency (e.g., its fuel economy).

Figure 4:
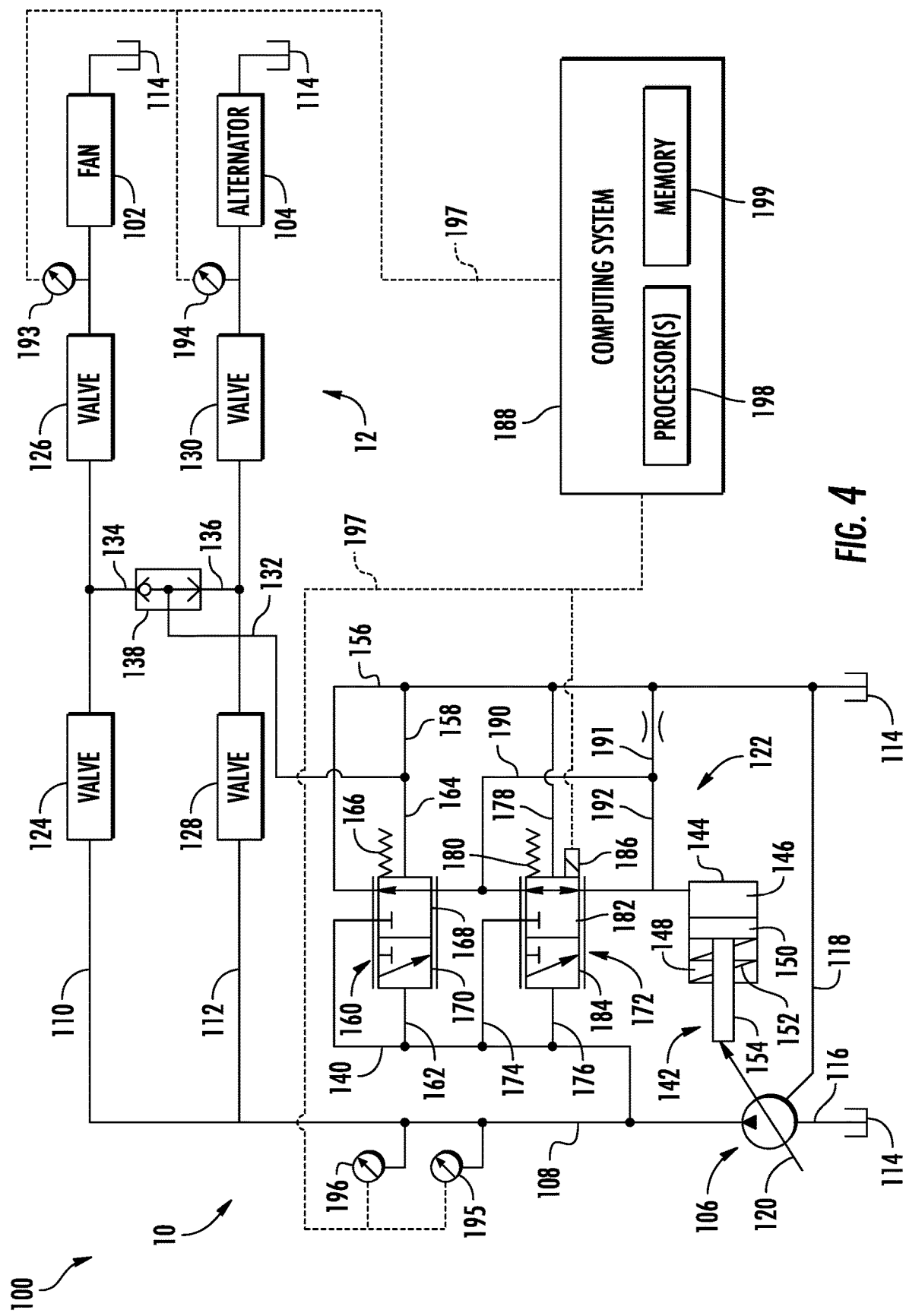
FIG. 4 illustrates a schematic view of another embodiment of a system for controlling pump operation within a work vehicle in accordance with aspects of the present subject matter.

Referring now to FIG. 4, a schematic view of another embodiment of a system 100 for controlling pump operation within a work vehicle is illustrated in accordance with aspects of the present subject matter. In general, the embodiment of the system 100 depicted in FIG. 4 is configured similarly to the embodiment of the system 100 depicted in FIG. 3. For example, like the system 100 illustrated in FIG. 3, the system 100 shown in FIG. 4 includes various components of the hydraulic system of the work vehicle 10, such as first and second hydraulic loads (e.g., the fan 102 and the alternator 104); the pump 106; the reservoir 114, the valves 124, 126, 123, 130, 138; the conduits 108, 116, 118, 110, 112, 132, 134, 136; and the pump compensator 122. Furthermore, like the system 100 illustrated in FIG. 3, the system 100 shown in FIG. 4 includes the pressure sensors 193, 194, 195; the flow sensor 196; and the computing system 188. Additionally, like in the system 100 illustrated in FIG. 3, the computing system 188 of the system 100 shown in FIG. 4 is configured to control the operation of the pump compensator (e.g., the electric actuator 186 of the pressure compensator valve 172) based on the greater of the determined first and second pressures as well as the determined third pressure and the determined flow rate.

However, the pump compensator 122 of the system 100 shown in FIG. 4 is configured differently than the pump compensator 122 of the system 100 shown in FIG. 3. As shown in FIG. 4, the pump compensator assembly 122 includes a pump regulation actuator 142. In general, the pump regulation actuator 142 is configured to adjust the position of the swash plate 120 of the pump 106 based on a received flow of hydraulic fluid. As will be described below, other components of the pump compensator assembly 122 determine whether the pump regulation actuator 142 receives a flow of the hydraulic fluid from the load sense conduit 132 (i.e., fluid having the same pressure as the greater of the pressures in the first and second fluid conduits 110, 112) or the fluid supply conduit 108. Based on the pressure of the received hydraulic fluid, the pump regulator actuator 142 mechanically adjusts the position of the swash plate 120.

In the illustrated embodiment, the pump regulator actuator 142 is configured as a hydraulic cylinder. More specifically, as shown, the pump regulation actuator 142 includes a housing 144 defining first and second fluid chambers 146, 148 separated by a movable piston 150. The first chamber 146 is configured to receive hydraulic fluid from either the load sense conduit 132 or the fluid supply conduit 108. Conversely, a biasing element 152 (e.g., a spring) is positioned within the second chamber 148. to this respect, the piston 150 moves within the housing 144 based on the difference in the force exerted on one side of the piston 150 by the hydraulic fluid. in the first chamber 146 and the force exerted the other side of the piston 150 by the biasing element 152. For example, when the force exerted by the hydraulic fluid within the first chamber 146 exceeds the force exerted by the biasing element 152, the first chamber 146 expands and the second chamber 148 contracts. Such movement of the piston 150 causes a rod 154 coupled to the piston 150 to extend from the housing 144, thereby moving the swash plate 120 in a manner that increases the pressure and/or flow rate of the hydraulic fluid being discharged by the pump 106. Conversely, when the force exerted by the hydraulic fluid within the first chamber 146 falls below the force exerted by the biasing element 152, the first chamber 146 contracts and the second chamber 148 expands. Such movement of the piston 150 causes the rod 154 to retract into the housing 144, thereby moving the swash plate 120 in a manner that decreases the pressure and/or flow rate of the hydraulic fluid being discharged by the pump 106. However, in alternative embodiments, the pump regulator actuator 142 may be configured as any other type of actuator or mechanism configured to adjust the position of the swash plate 120 based on a received flow of hydraulic fluid.

Additionally, the pump compensator assembly 122 may include a compensator conduit 156. As shown, the compensator conduit 156 is fluidly coupled between the pump regulator actuator 142 (e.g., its first chamber 146) and the reservoir 114. In addition, the compensator conduit 156 is fluidly coupled to the load sense conduit 132 via a conduit 158. As will be described below, the compensator conduit 156 may be fluidly coupled to valves within the pressure compensator assembly 122. Such valves, in turn, control whether hydraulic fluid from the fluid supply conduit 108 or hydraulic fluid from the load sense conduit 132 is supplied to the pump regulator actuator 142.

Furthermore, the pump compensator assembly 122 includes a flow compensator valve 160. In general, the flow compensator valve 160 is fluidly coupled to the fluid supply conduit 108 via the conduit 140. in addition, the flow compensator valve 160 is fluidly coupled to the load sense conduit 132 via the conduit 158 and the compensator conduit 156. As will be described below, the flow compensator valve 160 is configured to at least partially control the flow of hydraulic fluid to the pump regulation actuator 142.

In several embodiments, the flow compensator valve 160 may be entirely fluidly controlled. For example, the flow compensator valve 160 may be a pilot-operated valve. More specifically, in such embodiments, a pilot conduit 162 may be fluidly coupled to the flow compensator valve 160 and the conduit 140. As such, the pilot conduit 162 may provide a pilot flow of hydraulic fluid from the fluid supply conduit 108 to the flow compensator valve 160. Furthermore, a pilot conduit 164 may be fluidly coupled to the flow compensator valve 160 and the load sense conduit 132. In this respect, the pilot conduit 164 may provide a pilot flow of hydraulic fluid from the load sense conduit 132 to the flow compensator valve 160, Additionally, the flow compensator valve 160 may have a biasing element 166, such as a spring, that sets a valve margin.

Additionally, in several embodiments, the flow compensator valve 160 may movable between a first position 168 and a second position 170. More specifically, the biasing element 166 may exert a biasing force on the flow compensator valve 160 such that the valve 160 is normally at the first position 168. Thus, when the pressure of the hydraulic fluid in the pilot conduit 162 falls below the sum of the pressure in the hydraulic fluid in the pilot conduit 164 and the pressure exerted by the biasing element 166, the flow compensator valve 160 is at the first position 168. When at the first position 168, the flow compensator valve 160 supplies hydraulic fluid from the load sense conduit 132 to an electronically controlled pressure compensator valve 172 of the pump compensator assembly 122. However, when the pressure of the hydraulic fluid in the pilot conduit 162 exceeds the sum of the pressure in the hydraulic fluid in the pilot conduit 164 and the pressure exerted by the biasing element 166, the flow compensator valve 160 moves to the second position 170. When at the second position 170, the flow compensator valve 160 supplies hydraulic fluid from the fluid supply conduit 108 and the conduit 140 to the electronically controlled pressure compensator valve 172.

Furthermore, the system 100 includes the electronically controlled pressure compensator valve 172. In general, the pressure compensator valve 172 is fluidly coupled to the fluid supply conduit 108 via the conduit 140 and a conduit 174. Thus, the pressure compensator valve 172 is fluidly coupled to the fluid supply conduit 108 independently of the flow compensator valve 160. As will be described below, the pressure compensator valve 172 is configured to at least partially control the flow of hydraulic fluid to the pump regulation actuator 142.

In several embodiments, the pressure compensator valve 172 may be a pilot-operated valve. More specifically, in such embodiments, a pilot conduit 176 may be fluidly coupled to the pressure compensator valve 172 and the conduit 140. As such, the pilot conduit 176 may provide a pilot flow of hydraulic fluid from the fluid supply conduit 108 to the pressure compensator valve 172. Furthermore, a pilot conduit 178 may be fluidly coupled to the pressure compensator valve 172 and the compensator conduit 156. In this respect, the pilot conduit 178 may provide a pilot flow of hydraulic fluid from the load sense conduit 132 to the pressure compensator valve 172. Additionally, the pressure compensator valve 172 may have a biasing element 180, such as a spring, that sets a valve margin.

In general, the pressure compensator valve 172 may movable between a first position 182 and a second position 184. More specifically, the biasing element 180 may exert a biasing force on the pressure compensator valve 172 such that the valve 172 is normally at the first position 182. Thus, when the pressure of the hydraulic fluid in the pilot conduit 176 falls below the sum of the pressure in the hydraulic fluid in the pilot conduit 178 and the pressure exerted by the biasing element 180, the pressure compensator valve 172 is at the first position 182. When at the first position 182, the pressure compensator valve 172 supplies hydraulic fluid. from either the load sense conduit 132 or the fluid supply conduit 108 to the pump regulation actuator 142 based on an operation of the flow compensator valve 160. However, when the pressure of the hydraulic fluid in the pilot conduit 176 exceeds the sum of the pressure in the hydraulic fluid in the pilot conduit 178 and the pressure exerted by the biasing element 180, the pressure compensator valve 172 moves to the second position 184. When at the second position 184, the pressure compensator valve 172 supplies hydraulic fluid from the fluid supply conduit 108 and the conduit 140 to the pump regulation actuator 142.

Furthermore, in several embodiments, the pressure compensator valve 172 includes an electric actuator 186. In general, the electric actuator 186 is configured to move the pressure compensator valve 172 between the first and second positions 182, 184. As such, the electric actuator 186 can override the operation of the pressure compensator valve 172 based on the pilot flows received from the fluid supply conduit 108 and the load sense conduit 132. As will be described below, the electric actuator 186 may be controlled by a computing system 188 based on the maximum fluid pressure needed by the hydraulic loads, thereby reducing the energy consumption of the vehicle 10. For example, when the pressures of the pilot flows are such that the pressure compensator valve 172 is at the first position 182, the electric actuator 186 may, upon instructions from the computing system 188, move the pressure compensator valve 172 to the second position 184. Similarly, when the pressures of the pilot flows are such that the pressure compensator valve 172 is at the second position 184, the electric actuator 186 may, upon instructions from the computing system 188, move the pressure compensator valve 172 to the first position 182. The electric actuator 186 may correspond to any suitable electric actuator that can be controlled by the computing system 188, such as a solenoid, an electric linear actuator, a stepper motor, and/or the like.

As mentioned above, the flow compensator valve 160 and the pressure compensator valve 172 control the flow of hydraulic fluid from the fluid supply conduit 108 and the load sense conduit 132 to the pump regulation actuator 142. This flow of hydraulic fluid, in turn, controls the operation of the pump regulation actuator 142 and, thus, the pump 106. More specifically, when the flow compensator valve 160 is at its first position 168 and the pressure compensator valve 172 is at its first position 182, hydraulic fluid from the load sense conduit 132 is supplied to the pump regulation actuator 142 via the compensator conduit 156. Conversely, when the flow compensator valve 160 is at its second position 170 and the pressure compensator valve 172 is at its first position 182, hydraulic fluid from the fluid supply conduit 108 is supplied to the pump regulation actuator 142 via the compensator conduit 156. Moreover, when the flow compensator valve 160 is at its first position 168 and the pressure compensator valve 172 is at either its first or second positions 182, 184, hydraulic fluid from the fluid supply conduit 108 is supplied to the pump regulation actuator 142 via the compensator conduit 156.

In addition, the pump compensator assembly 122 may include any other suitable fluid conduits and or flow control devices (e.g., valves, orifices, etc.). For example, in the illustrated embodiment, the pump compensator assembly 122 include a bypass conduit 190 fluidly coupled to the compensator conduit 156 between the flow compensator valve 160 and the pressure compensator valve 172. Moreover, the bypass conduit 190 is coupled to the compensator conduit 156 between the flow compensator valve 160 and the reservoir 114 via a conduit 191. Furthermore, the bypass conduit 190 is coupled to the compensator conduit 156 between the pressure compensator valve 172 and the pump regulation actuator 142 via a conduit 192.

Figure 5:
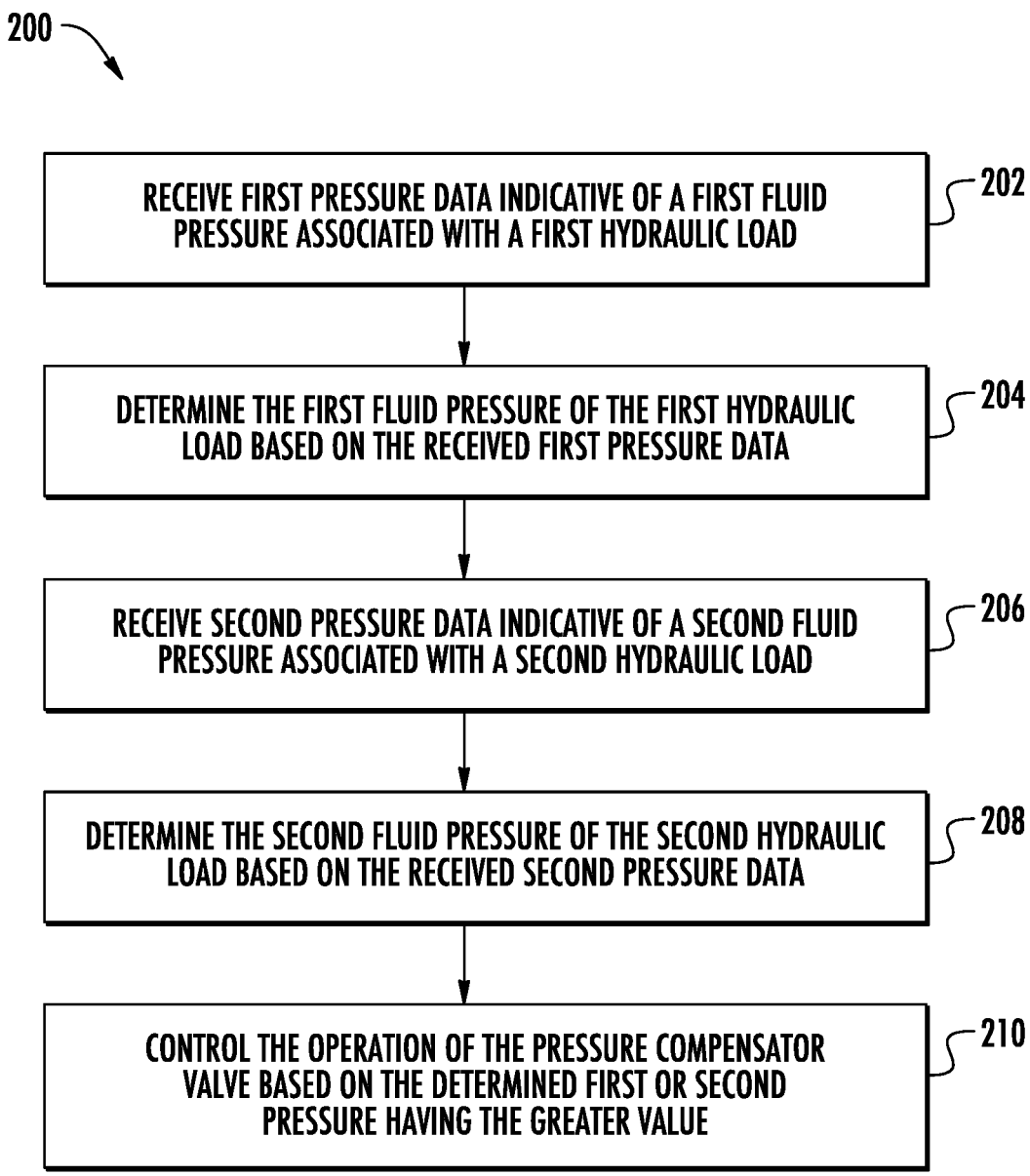
FIG. 5 illustrates a flow diagram of one embodiment of a method for controlling pump operation within a work vehicle in accordance with aspects of the present subject matter.

Referring now to FIG. 5, a flow diagram of one embodiment of a method 200 for controlling pump operation within a work vehicle is illustrated in accordance with aspects of the present subject matter. In general, the method 200 will be described herein with reference to the work vehicle 10, the implement 12, and the system 100 described above with reference to FIGS. 1-4. However, it should be appreciated by those of ordinary skill in the art that the disclosed method 200 may generally be implemented with any work vehicle having any suitable vehicle configuration, any implement having any suitable implement configuration, and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving, with a computing system, first pressure data indicative of a first fluid pressure associated with a first hydraulic load. For instance, as described above, the computing system 188 may be configured to receive first pressure data from the first pressure sensor 193. Such first pressure sensor data is, in turn, indicative of the first fluid pressure associated with the first hydraulic load (e.g., the fan 102).

Additionally, at (204), the method 200 may include determining, with the computing system, the first fluid pressure of the first hydraulic load based on the received first pressure data. For instance, as described above, the computing system 188 may be configured to determine the first fluid pressure of the first hydraulic load (e.g., the fan 102) based on the received first pressure data.

Moreover, as shown in FIG. 5, at (206), the method 200 may include receiving, with the computing system, second pressure data indicative of a second fluid pressure associated with a second hydraulic load. For instance, as described above, the computing system 188 may be configured to receive second pressure data from the second pressure sensor 194. Such second pressure sensor data is, in turn, indicative of the second fluid pressure associated with the second hydraulic load (e.g., the alternator 104).

Furthermore, at (208), the method 200 may include determining, with the computing system, the second fluid pressure of the second hydraulic load based on the received second pressure data. For instance, as described above, the computing system 188 may be configured to determine the second fluid pressure of the second hydraulic load (e.g., the alternator 104) based on the received second pressure data.

In addition, at (210), the method 200 may include controlling, with the computing system, the operation of the pressure compensator valve based on the determined first or second pressure having the greater value. For instance, as described above, the computing system 188 may be configured to control the operation of the electric actuator 186 of the electronically controlled pressure compensator valve 172 based on the determined first or second pressure having the greater value.

It is to be understood that the steps of the method 200 are performed by the computing system 188 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 188 described herein, such as the method 200, is implemented in software code or instructions which are tangibly stored on a tangible computer readable medium. The computing system 188 loads the software code or instructions via a direct interface with the computer readable medium or via a wired and/or wireless network. Upon loading and executing such software code or instructions by the computing system 188, the computing system 188 may perform any of the functionality of the computing system 188 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling pump operation within a work vehicle, the system comprising:
    a pump including a swash plate, the pump configured to discharge hydraulic fluid into a fluid supply conduit for delivery to first and second hydraulic loads of an associated agricultural implement, the first hydraulic load being in parallel with the second hydraulic load;
    first and second fluid conduits fluidly coupled between the fluid supply conduit and the first and second hydraulic loads, respectively;
    first and second bleed conduits fluidly coupled to the first and second fluid conduits, respectively;
    a shuttle valve fluidly coupled to the first and second bleed conduits;
    a load sense conduit fluidly coupled to the shuttle valve, the load sense conduit configured to receive a portion of the hydraulic fluid from the first or second fluid conduit in which the hydraulic fluid is at a greater pressure; and
    a pump compensator assembly configured to control the operation of the pump, the pump compensator assembly comprising:
        a pump regulation actuator configured to adjust a position of the swash plate based on a flow of the hydraulic fluid received from the load sense conduit or the fluid supply conduit;
        a flow compensator valve fluidly coupled to the load sense conduit, the flow compensator valve configured to at least partially control the flow of the hydraulic fluid to the pump regulation actuator; and
        an electronically controlled pressure compensator valve fluidly coupled to the load sense conduit, the electronically controlled pressure compensator configured to at least partially control the flow of the hydraulic fluid to the pump regulation actuator, wherein the electronically controlled pressure compensator valve comprises a two-position proportional valve and an electric actuator configured to move the electronically controlled pressure compensator valve between first and second positions.

2. The system of claim 1, wherein the electronically controlled pressure compensator valve comprises a pressure relief valve.

3. The system of claim 1, wherein the electronically controlled pressure compensator valve is fluidly coupled to the fluid supply conduit.

4. The system of claim 3, wherein, when the electronically controlled pressure compensator valve at the first position, the electronically controlled pressure compensator valve supplies the hydraulic fluid from the load sense conduit or the fluid supply conduit to the pump regulation actuator based on an operation of the flow compensator valve.

5. The system of claim 3, wherein, when the electronically controlled pressure compensator valve at the second position, the electronically controlled pressure compensator valve supplies the hydraulic fluid from the fluid supply conduit to the pump regulation actuator.

6. The system of claim 1, wherein the electronically controlled pressure compensator valve is configured to receive a pilot flow of the hydraulic fluid from the fluid supply conduit.

7. The system of claim 1, further comprising:
a computing system configured to control an operation of the electric actuator.

8. The system of claim 7, further comprising:
a first pressure sensor configured to capture data indicative of a first fluid pressure associated with the first hydraulic load; and
a second pressure sensor configured to capture data indicative of a second fluid pressure associated with the second hydraulic load,
wherein the computing system is communicatively coupled to the first and second pressure sensors, the computing system is configured to:
determine the first fluid pressure of the first hydraulic load based on the data captured by the first pressure sensor;
determine the second fluid pressure of the second hydraulic load based on the data captured by the second pressure sensor; and
control the operation of the electric actuator based on the determined first or second fluid pressure having a greater value.

9. The system of claim 8, further comprising:
a third pressure sensor configured to capture data indicative of a fluid supply pressure of the hydraulic fluid being discharged by the pump; and
a flow sensor configured to capture data indicative of a flow rate of the hydraulic fluid being discharged by the pump,
wherein the computing system is communicatively coupled to the third pressure sensor and the flow sensor, the computing system configured to:
determine the third fluid pressure of the hydraulic fluid being discharged by the pump based on the data captured by the third pressure sensor;
determine the flow rate of the hydraulic fluid being discharged by the pump based on the data captured by the flow sensor; and
control the operation of the electric actuator based on the determined third fluid pressure and the determined flow rate in addition to the determined first or second fluid pressure having the greater value.

10. The system of claim 1, wherein the flow compensator valve is entirely fluidly controlled.

11. The system of claim 10, wherein the flow compensator valve is configured to receive a first pilot flow of the hydraulic fluid from the fluid supply conduit and a second pilot flow of the hydraulic fluid from the load sense conduit.

12. The system of claim 10, wherein the flow compensator valve is moveable between a first position at which the flow compensator valve supplies the hydraulic fluid from the load sense conduit to the electronically controlled pressure compensator valve and a second position at which the flow compensator valve supplies the hydraulic fluid from the fluid supply conduit to the electronically controlled pressure compensator valve.

13. A system for controlling pump operation within a work vehicle, the system comprising:
a pump including a swash plate, the pump configured to discharge hydraulic fluid into a fluid supply conduit for delivery to first and second hydraulic loads of an associated agricultural implement, the first hydraulic load being in parallel with the second hydraulic load;
first and second fluid conduits fluidly coupled between the fluid supply conduit and the first and second hydraulic loads, respectively;
first and second bleed conduits fluidly coupled to the first and second fluid conduits, respectively;
a shuttle valve fluidly coupled to the first and second bleed conduits;
a load sense conduit fluidly coupled to the shuttle valve, the load sense conduit configured to receive a portion of the hydraulic fluid from the first or second fluid conduit in which the hydraulic fluid is at a greater pressure; and
a pump compensator assembly configured to control the operation of the pump, the pump compensator assembly comprising:
a pump regulation actuator configured to adjust a position of the swash plate based on a flow of the hydraulic fluid received from the load sense conduit or the fluid supply conduit;
a flow compensator valve fluidly coupled to the load sense conduit, the flow compensator valve configured to at least partially control the flow of the hydraulic fluid to the pump regulation actuator; and
an electronically controlled pressure compensator valve fluidly coupled to the load sense conduit, the electronically controlled pressure compensator configured to at least partially control the flow of the hydraulic fluid to the pump regulation actuator, wherein, when the electronically controlled pressure compensator valve at the first position, the electronically controlled pressure compensator valve occludes flow of the hydraulic fluid from the load sense conduit to the pump regulation actuator.

14. A system for controlling pump operation within a work vehicle, the system comprising:
a pump including a swash plate, the pump configured to discharge hydraulic fluid into a fluid supply conduit for delivery to first and second hydraulic loads of an associated agricultural implement, the first hydraulic load being in parallel with the second hydraulic load;
first and second fluid conduits fluidly coupled between the fluid supply conduit and the first and second hydraulic loads, respectively;
first and second bleed conduits fluidly coupled to the first and second fluid conduits, respectively;
a shuttle valve fluidly coupled to the first and second bleed conduits;
a load sense conduit fluidly coupled to the shuttle valve, the load sense conduit configured to receive a portion of the hydraulic fluid from the first or second fluid conduit in which the hydraulic fluid is at a greater pressure; and
a pump compensator assembly configured to control the operation of the pump, the pump compensator assembly comprising:
a pump regulation actuator configured to adjust a position of the swash plate based on a flow of the hydraulic fluid received from the load sense conduit or the fluid supply conduit;
a flow compensator valve fluidly coupled to the load sense conduit, the flow compensator valve configured to at least partially control the flow of the hydraulic fluid to the pump regulation actuator; and
an electronically controlled pressure compensator valve fluidly coupled to the load sense conduit, the electronically controlled pressure compensator configured to at least partially control the flow of the hydraulic fluid to the pump regulation actuator, wherein, when the electronically controlled pressure compensator valve at the second position, the electronically controlled pressure compensator valve supplies the hydraulic fluid from the fluid supply conduit to the flow compensator valve.

15. A system for controlling pump operation within a work vehicle, the system comprising:
   a pump including a swash plate, the pump configured to discharge hydraulic fluid into a fluid supply conduit for delivery to first and second hydraulic loads of an associated agricultural implement, the first hydraulic load being in parallel with the second hydraulic load;
   first and second fluid conduits fluidly coupled between the fluid supply conduit and the first and second hydraulic loads, respectively;
   first and second bleed conduits fluidly coupled to the first and second fluid conduits, respectively;
   a shuttle valve fluidly coupled to the first and second bleed conduits;
   a load sense conduit fluidly coupled to the shuttle valve, the load sense conduit configured to receive a portion of the hydraulic fluid from the first or second fluid conduit in which the hydraulic fluid is at a greater pressure; and
   a pump compensator assembly configured to control the operation of the pump, the pump compensator assembly comprising:
      a pump regulation actuator configured to adjust a position of the swash plate based on a flow of the hydraulic fluid received from the load sense conduit or the fluid supply conduit;
      a flow compensator valve fluidly coupled to the load sense conduit, the flow compensator valve configured to at least partially control the flow of the hydraulic fluid to the pump regulation actuator; and
      an electronically controlled pressure compensator valve fluidly coupled to the load sense conduit, the electronically controlled pressure compensator configured to at least partially control the flow of the hydraulic fluid to the pump regulation actuator, wherein the work vehicle comprises an agricultural tractor.

16. A method controlling pump operation within a work vehicle, the work vehicle including a pump configured to discharge hydraulic fluid into a fluid supply conduit for delivery to first and second hydraulic loads, the first hydraulic load being in parallel with the second hydraulic load, the work vehicle further including a pump compensator assembly configured to control the operation of the pump, the pump compensator assembly including a pump regulation actuator configured to adjust a position of a swash plate of the pump based on a received flow of the hydraulic fluid, a flow compensator valve configured to at least partially control the flow of the hydraulic fluid to the pump regulation actuator, and a pressure compensator valve configured to at least partially control the flow of the hydraulic fluid to the pump regulation actuator, the method comprising:
   receiving, with a computing system, first pressure data indicative of a first fluid pressure associated with the first hydraulic load;
   determining, with the computing system, the first fluid pressure of the first hydraulic load based on the received first pressure data;
   receiving, with the computing system, second pressure data indicative of a second fluid pressure associated with the second hydraulic load;
   determining, with the computing system, the second fluid pressure of the second hydraulic load based on the received second pressure data;
   receiving, with the computing system, third pressure data indicative of a fluid supply pressure of the hydraulic fluid being discharged by the pump;
   determining, with the computing system, the third fluid pressure of the hydraulic fluid being discharged by the pump based on the received third pressure data;
   receiving, with the computing system, flow data indicative of a flow rate of the hydraulic fluid being discharged by the pump;
   determining, with the computing system, the flow rate of the hydraulic fluid being discharged by the pump based on the received flow data; and
   controlling, with the computing system, the operation of the pressure compensator valve based on the determined first or second pressure having a greater value, the determined fluid pressure, and the determined flow rate.

17. A system for controlling pump operation within a work vehicle, the system comprising:
   a pump including a swash plate, the pump configured to discharge hydraulic fluid into a fluid supply conduit for delivery to first and second hydraulic loads of an associated agricultural implement, the first hydraulic load being in parallel with the second hydraulic load;
   first and second fluid conduits fluidly coupled between the fluid supply conduit and the first and second hydraulic loads, respectively;
   a load sense conduit configured to receive a portion of the hydraulic fluid from the first or second fluid conduit in which the hydraulic fluid is at a greater pressure; and
   a pump compensator assembly configured to control the operation of the pump, the pump compensator assembly comprising:
      a pump regulation actuator configured to adjust a position of the swash plate based on a flow of the hydraulic fluid received from the load sense conduit or the fluid supply conduit;
      a flow compensator valve fluidly coupled to the load sense conduit, the flow compensator valve configured to at least partially control the flow of the hydraulic fluid to the pump regulation actuator; and
      an electronically controlled pressure compensator valve configured to at least partially control the flow of the hydraulic fluid to the pump regulation actuator, the electronically controlled pressure compensator valve including an electric actuator configured to move the electronically controlled pressure compensator valve between first and second positions;
   a first pressure sensor configured to capture data indicative of a first fluid pressure associated with the first hydraulic load;
   a second pressure sensor configured to capture data indicative of a second fluid pressure associated with the second hydraulic load;
   a third pressure sensor configured to capture data indicative of a fluid supply pressure of the hydraulic fluid being discharged by the pump;
   a flow sensor configured to capture data indicative of a flow rate of the hydraulic fluid being discharged by the pump; and
   a computing system communicatively coupled to the first pressure sensor, the second pressure sensor, the third pressure sensor, and the flow sensor, the computing system configured to:

determine the first fluid pressure of the first hydraulic load based on the data captured by the first pressure sensor;

determine the second fluid pressure of the second hydraulic load based on the data captured by the second pressure sensor;

determine the third fluid pressure of the hydraulic fluid being discharged by the pump based on the data captured by the third pressure sensor;

determine the flow rate of the hydraulic fluid being discharged by the pump based on the data captured by the flow sensor; and control the operation of the electric actuator based on the determined first or second fluid pressure having a greater value, the determined third fluid pressure, and the determined flow rate.

\* \* \* \* \*